US006219421B1

United States Patent
Backal (10) Patent No.: US 6,219,421 B1
(45) Date of Patent: *Apr. 17, 2001

(54) VIRTUAL MATRIX ENCRYPTION (VME) AND VIRTUAL KEY CRYPTOGRAPHIC METHOD AND APPARATUS

(75) Inventor: Shaul O. Backal, 19528 Ventura Blvd., #317, Tarzana, CA (US) 91356

(73) Assignee: Shaul O. Backal, Tarzana, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/957,288

(22) Filed: Oct. 24, 1997

(51) Int. Cl.$^7$ ...................................................... A04K 1/00
(52) U.S. Cl. .................................................. 380/28; 380/28
(58) Field of Search ........................................ 380/28, 57

(56) References Cited

U.S. PATENT DOCUMENTS

| | | | |
|---|---|---|---|
| 744,041 | * 11/1903 | Burke | 380/57 |
| 3,250,855 | * 5/1966 | Vasseur | 380/262 |
| 4,157,454 | 6/1979 | Becker | 178/22 |
| 4,740,890 | * 4/1988 | William | 364/200 |
| 4,988,987 | * 1/1991 | Barrett et al. . | |
| 5,058,160 | * 10/1991 | Banker et al. | 380/20 |
| 5,703,948 | * 12/1997 | Yanovsky | 380/262 |
| 5,712,800 | 1/1998 | Aucsmith | 364/514 R |
| 5,771,291 | * 6/1998 | Newton et al. | 380/25 |
| 5,787,172 | * 7/1998 | Arnold | 380/21 |
| 5,835,600 | 11/1998 | Rivest | 380/44 |

OTHER PUBLICATIONS

Schneier, Applied Cryptography 2e, pp. 170–177, 1996.*

Menezes, et al., Applied Cryptography, p. 172, 1996.*

Bruce Schneier, Applied cryptography, 2e, John Wiley pp. 183–184, 1996.*

* cited by examiner

*Primary Examiner*—Gail Hayes
*Assistant Examiner*—James W Seal
(74) *Attorney, Agent, or Firm*—Burns, Doane, Swecker & Mathis, LLP (57) ABSTRACT

A data security method and apparatus that provides an exceptional degree of security at low computational cost. The data security arrangement differs from known data security measures in several fundamental aspects. Most notably, the content of the message is not sent with the encrypted data. Rather, the encrypted data consists of pointers to locations within a virtual matrix, a large (arbitrarily large), continuously-changing array of values. The encryption technique is therefore referred to as Virtual Matrix Encryption. Furthermore, the data security arrangement uses a very large key of one million bits or more which creates a level of security much higher than any other existing method. The key is not transferred but is instead created from a file of any size that is available on both a computer used to send a secure message and a computer used to receive a secure message. The term Virtual Key Cryptographic as used herein to refer to techniques in which a key is recreated at a remote location from an electronic file without any transmission of the key itself. The file may be a system file, a file downloaded from the Internet, etc. A smaller, transaction-specific key, e.g., a 2,048 bit key, is sent end-to-end and is used in conjunction with the very large key to avoid a security hazard in instances where the same file is used repeatedly to create the very large key.

16 Claims, 11 Drawing Sheets

VME – Virtual Matrix Encryption

FIG. 1

VM–Virtual Matrix
PVM=Progressive Virtual Matrix
RVM=Regressive Virtual Matrix
VMP=Virtual Matrix Pointer

MMM—Multiplication Module Matrix
Keys Generation Phase—
    Once per Session
Encryption Phase—
    Multiple times per Session
Decryption Phase—
    Multiple times per Session
P=Changing Variable

SMM-Subtraction Module Matrix
A,B,C,D,E are Changing Flow Parameters

VIRTUAL MATRIX ENCRYPTION (VME) AND VIRTUAL KEY CRYPTOGRAPHIC METHOD AND APPARATUS

BACKGROUND OF THE INVENTION

1. Field of the Invention

The present invention relates to data security.

2. Description of the Related Art

Many different types of data security measures are known. Presently, most widespread data security measures are based on public-key encryption. Public-key encryption is described, for example, in U.S. Pat. No. 4,218,582, incorporated herein by reference. Other patents relating to public-key encryption include U.S. Pat. Nos. 4,200,770; 4,405,829; 4,424,414 and 4,995,082, all of which are incorporated herein by reference.

One of the reasons for the relative prominence of public-key cryptography is that it solves the problem of key distribution in an elegant fashion.

Prior to public-key cryptography, symmetric-key cryptography required use of the identical key to decrypt the file as was used to encrypt the file. Hence, the key had to be communicated in secrecy between users. In public-key encryption, the encryption and the decryption keys are separate, with the encryption key being publicly known and the decryption key being kept secret. Public-key encryption may also be used for authentication.

Despite the important advantage of not requiring secure key distribution, public-key cryptography also suffers from various disadvantages. Administration is typically required to ensure that unique public-keys are assigned to each user. A person's public-key must be listed in a directory, and must be found in the directory prior to encrypting a message. The computational burden of public-key cryptography is significant both in generating random prime numbers for use as keys and in encryption and decryption processing itself. Furthermore, despite the computational complexity, public-key encryption using medium size keys has been shown to be insecure given the tremendous network computing resources that may be brought to bear on breaking the encryption.

What is needed, then, is a data security mechanism that surpasses in security present public-key cryptography methods and that minimizes the computational burden involved.

SUMMARY OF THE INVENTION

The present invention, generally speaking, provides a data security method and apparatus that provides an exceptional degree of security at low computational cost. The data security arrangement differs from known data security measures in several fundamental aspects. Most notably, the content of the message is not sent with the encrypted data. Rather, the encrypted data consists of pointers to locations within a virtual matrix, a large (arbitrarily large), continuously-changing array of values. The encryption technique is therefore referred to as Virtual Matrix Encryption. Furthermore, the data security arrangement uses a very large key of one million bits or more which creates a level of security much higher than any other existing method. The key is not transferred but is instead created from a file of any size that is available on both a computer used to send a secure message and a computer used to receive a secure message. The term Virtual Key Cryptographic as used herein to refer to techniques in which a key is recreated at a remote location from an electronic file without any transmission of the key itself. The file may be a system file, a file downloaded from the Internet, etc. A smaller, transaction-specific key, e.g., a 2,048 bit key, is sent end-to-end and is used in conjunction with the very large key to avoid a security hazard in instances where the same file is used repeatedly to create the very large key. A single byte may be encrypted many, many times, each successive result being passed to another algorithm in what may be regarded as a random path determined by reseeding of a random number generator at various junctures using values from the very large key, the smaller key and various other user supplied parameters, including, for example, source user, destination user, file name, save-as file name, and description. An optional higher level of security is available. If the message is secured using the same string as the file name and save-to file name, then when unlocking is attempted the first time, the original file will be overwritten, affording only a single opportunity for the message to be unlocked. A message may be secured in accordance with various options specifying an intended audience, including "global," "specific" and "private" options. "Global" allows anyone having a copy of the data security software to decrypt the message providing that person has the correct keys and is able to supply parameters matching those with which the message was secured. "Group" allows the possibility of successful decryption by any of a number of users within a group identified by its members having copies of the software program with a common prefix. "specific" allows only a user having a particular numbered copy of the software program to decrypt. Finally, "private" allows decryption only by the same software copy used to secure the message originally. Without the correct keys and parameters, it is impossible for the message to be unlocked. The present invention further enhances security by allowing definition of a date range where the data can be decrypted correctly, hence preventing lengthy efforts to break the code by brute computational force.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
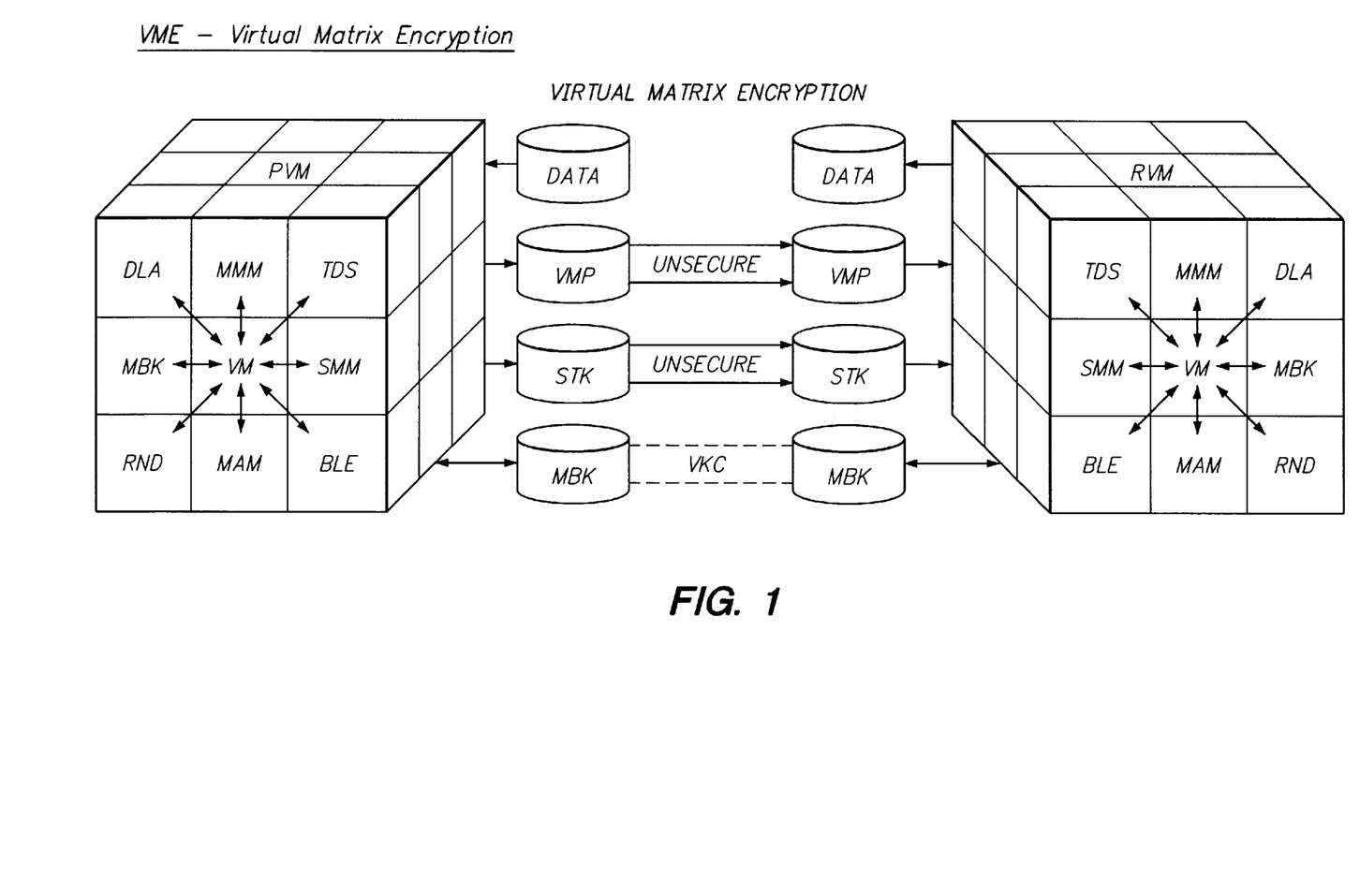
FIG. 1 is a generalized schematic block diagram of a Virtual Matrix Encryption technique in accordance with the present invention.

Referring now to FIG. 1, the data security technique of the present invention is shown in simplified, schematic form. Unlike existing encryption/decryption algorithms, the present technique uses a complex of algorithms, described individually hereinafter, to form a "pipeline" into which data to be secured is passed. While inside the pipeline, the data is subjected to myriad operations the particulars of which are controlled by specific keys and parameters. At one or more points along the pipeline, data passes through a Virtual Matrix (VM) module. The VM module uses a Progressive Virtual Matrix (PVM) to encrypt data. The PVM may be imagined as a kind of N dimensional "Rubik's cube" on each face of which all possible data values appear exactly once in random arrangement. When a data value is encrypted, it is replaced by a pointer value that points to the then-current location in the virtual matrix of the data value. Then the cube is "rotated," shuffling the data values so that the location of at least the last data value is changed.

In one embodiment of the invention, the pipeline may be imagined as consisting of various modules, including the VM module, connected in a random sequence. Each module may appear multiple times. However, different instances of the same module within the pipeline operate differently. In particular, some or all of the modules make use of a random number generator. Whereas in one instance of a given module one value may be used to seed the random number generator, in another instance, a different value may be used to seed the random number generator. Different instances of the same module therefore produce entirely different results. The various values used to seed the random number generator may include, for example, the last byte of original data, a Specific Transaction Key (STK), a "files" key, a "users" key, an encrypted byte input from a previous module, etc. The VM module produces the important result that message data is not itself transmitted even in encrypted form. Rather, pointers to message data (Virtual Matrix Pointers, or VMP) are transmitted. Because of this important property of the VM module, it is illustrated as a hub about which the various other modules are arranged. The specific modules are identified in the legend accompanying FIG. 1.

Both the VMP and the STK are transmitted across an unsecured channel. A very large key MBK (having, in one example, a size of one million bits) is generated and used locally but is not transmitted. The identical key is generated at the remote end in order to unlock the message. Because the same key is used at both ends of the transaction but is not transmitted from one end to the other, the key is referred to as a Virtual Key. Cryptographic methods using such a Virtual Key are referred to herein by the term Virtual Key Cryptograpic (in contrast to symmetric-key cryptography and public-key cryptography). This relationship between the MBK on the source side and the MBK on the destination side is indicated by dashed lines in FIG. 1. The MBK may be dynamically varied during the course of an encryption session.

Corresponding modules as referred to previously are arranged on the destination side in a reverse pipeline. The pipeline receives the VMP pointer data and performs operations on it in accordance with pieces of the STK and MBK to produce the original data.

Figure 2A:
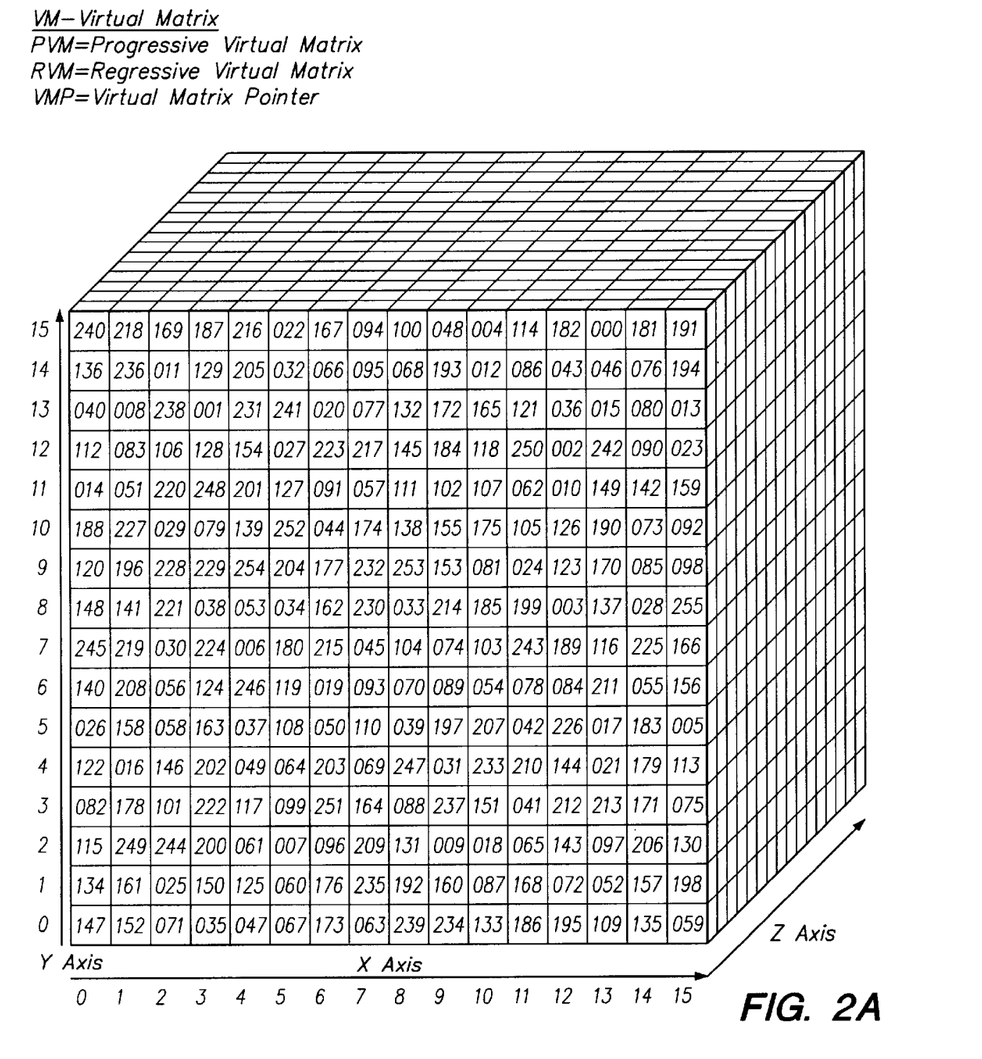
FIG. 2A is a schematic diagram of a Virtual Matrix.
Figure 2B:
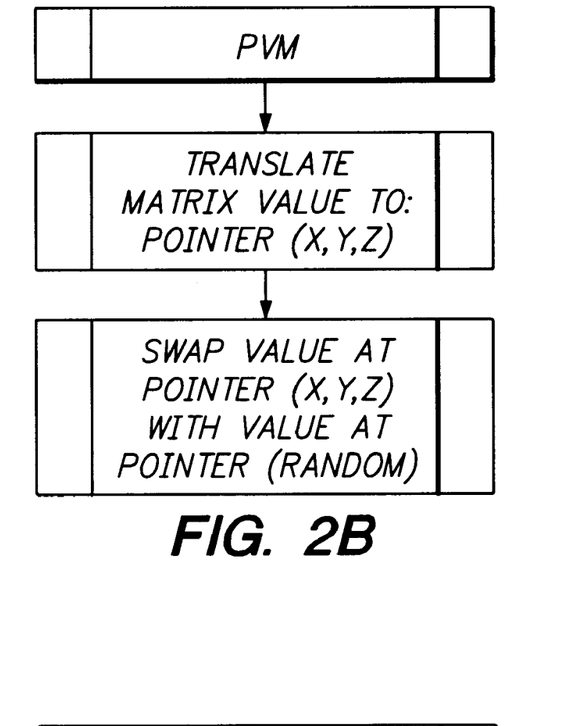
FIG. 2B is a flowchart of encryption using a Progressive Virtual Matrix.
Figure 2C:
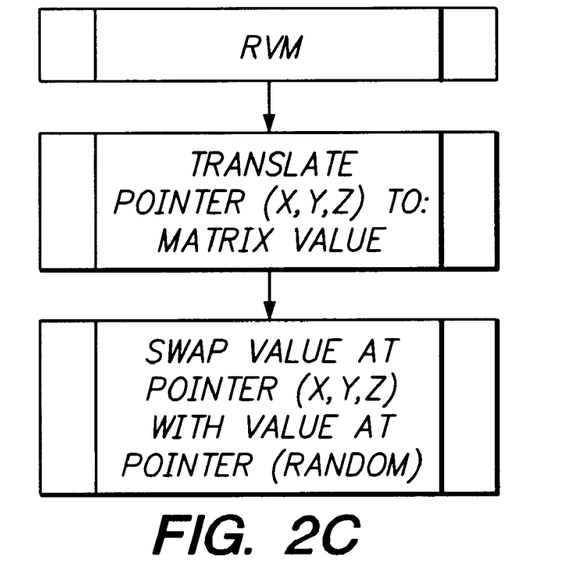
FIG. 2C is a flowchart of decryption using a Regressive Virtual Matrix.

Beginning now with FIG. 2, illustrating operation of the VM module, each of the modules of FIG. 1 will be described in greater detail.

A Virtual Matrix is an N-Dimensional array of arbitrary size. A particular value in the Virtual Matrix is therefore identified by a pointer (x, y, z . . . ). If one pointer is held constant, then, as each of the other pointers range over their possible values, every possible value being encrypted is encountered in random order. In the three dimensional example of FIG. 2A, the Virtual Matrix takes the form of a cube. On the Z=0 face of the cube, all the possible byte values from 0 to 255 appear in random positions. FIG. 2B illustrates operation on the encryption side using the Progressive Virtual Matrix (PVM). A byte value to be encrypted is located within the Virtual Matrix and replaced by a pointer (X, Y, Z) to that value. Once a particular value has been used, it is swapped with a value at a random position. On the destination end, the procedure is reversed (FIG. 2C).

Note that reseeding of the random number generator at the destination end is "reverse synchronized" with reseeding of the random number generator at the source end; accordingly, reverse random sequences are generated and changes to the Virtual Matrix at the destination end are "reverse synchronized" with changes to the Virtual Matrix at the source end.

Figure 3A:
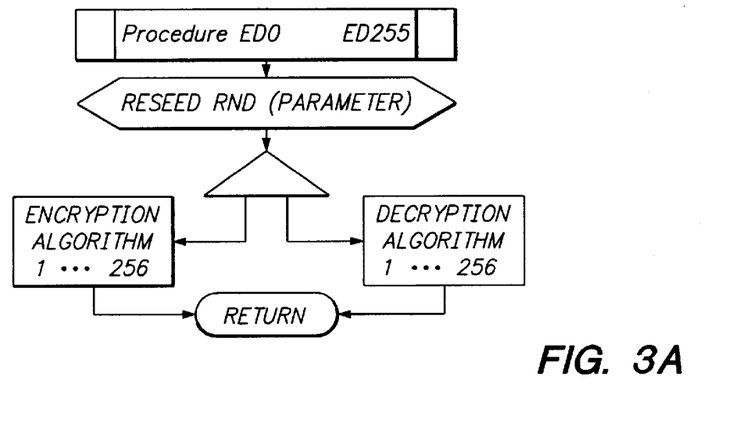
FIG. 3A is a flowchart of encryption/decryption using a Multiple Algorithms Matrix.

Referring to FIG. 3, operation of a Multiple Algorithms Matrix (MAM) module is illustrated. The MAM module consists chiefly of a large (e.g., 256) number of unique encryption algorithms and an equal number of corresponding decryption algorithms. Basically, each possible data value is encrypted/decrypted by its own unique algorithm. Referring in particular to FIG. 3A, when a given algorithm is run, first the random number generator is reseeded in accordance with a selected parameter. Then depending on whether encryption or decryption is being performed, the corresponding encryption or decryption algorithm is run.

Figure 3B:
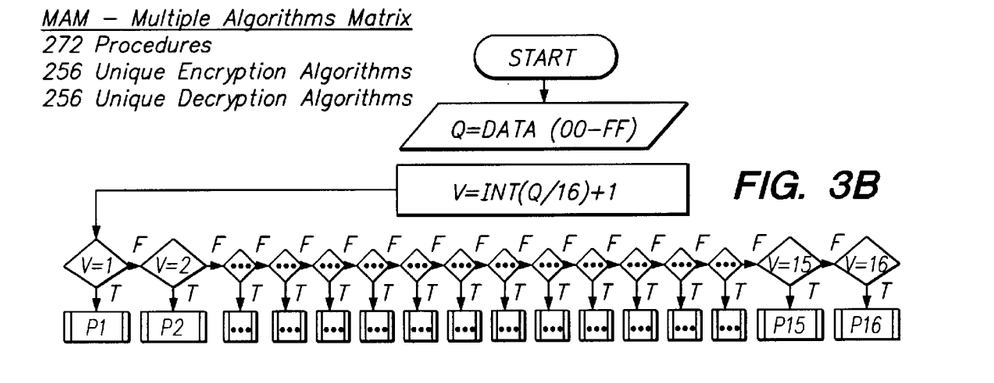
FIG. 3B is a flowchart of a first portion of a many way branching mechanism.
Figure 3C:
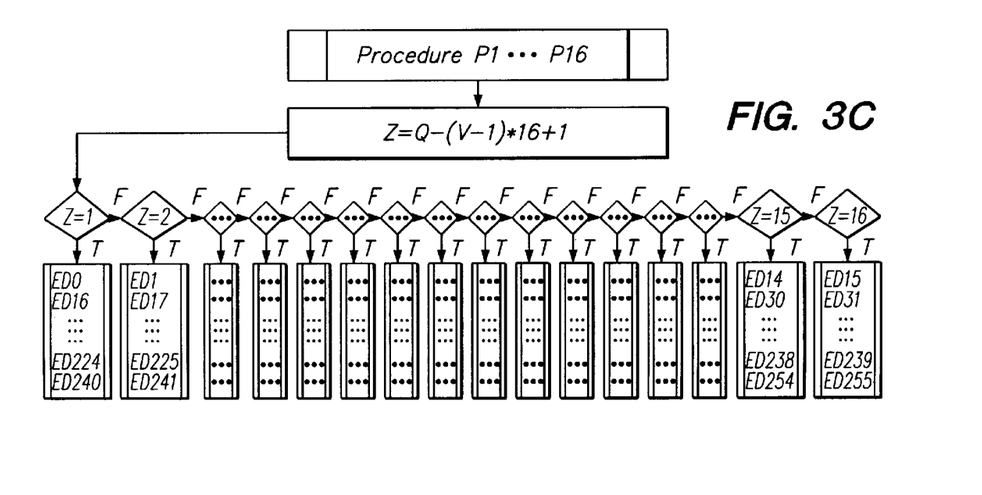
FIG. 3C is a second portion of the many way branching mechanism of FIG. 3B.

Large branches (e.g., 256-way) may require special branching procedures, illustrated in FIGS. 3A and 3B. Depending on the input data, one of some number of procedures (e.g., 16 procedures P1–P16) is run (FIG. 3B), which causes in turn one of a still larger number of algorithms (e.g., 256 algorithms EDO–ED256) to be run (FIG. 3C). If for example Q=16, then V=2 and P2 is run; within P2 it is determined that Z=1, with the result that the second listed algorithm (V=2) in the first list (Z=1) of FIG. 3B is run, namely ED16.

Figure 4:
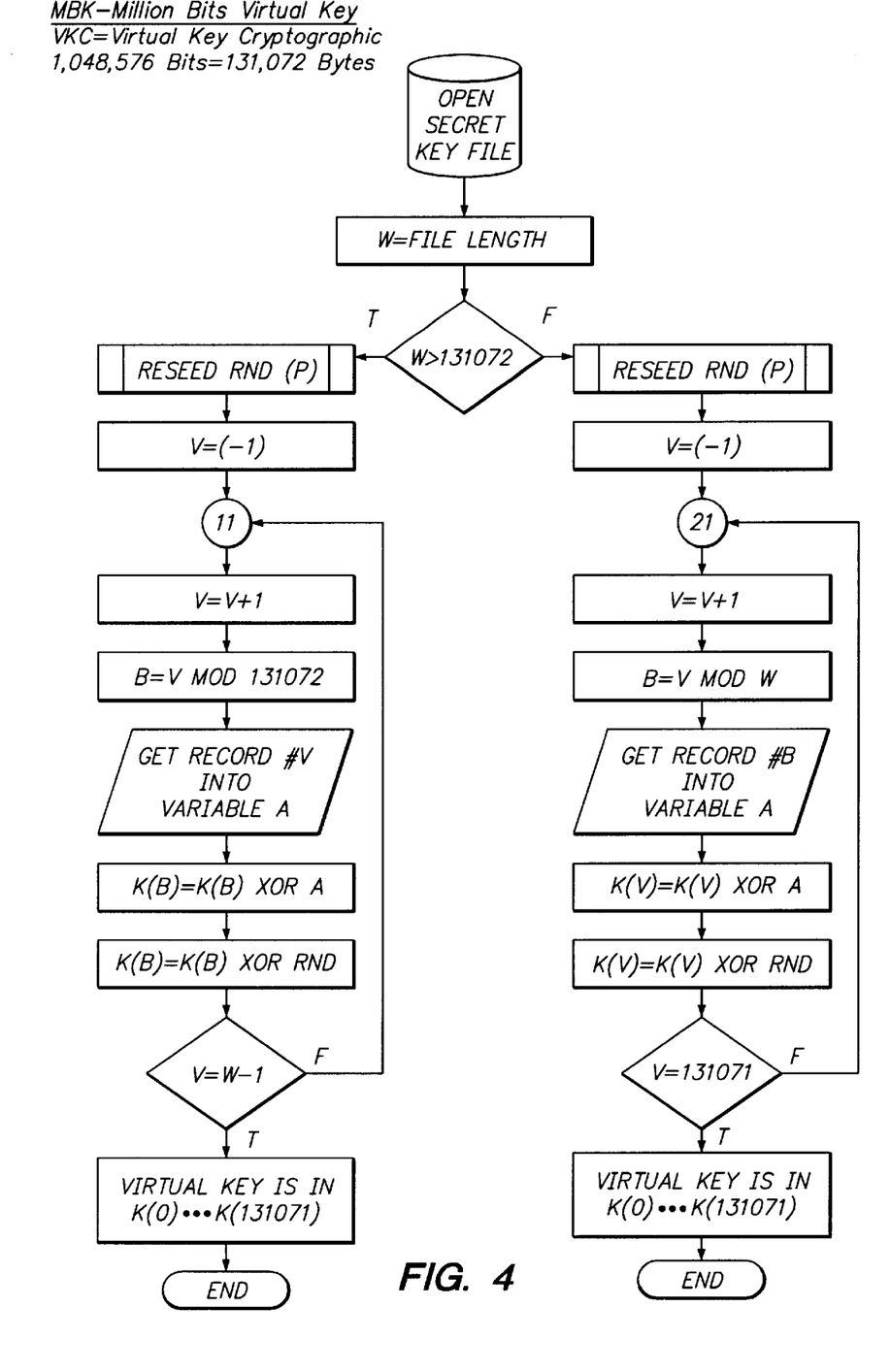
FIG. 4 is a flowchart illustrating generation of a Million Bit Virtual Key.

The manner in which an MBK may be built from an arbitrary file is illustrated in FIG. 4. At the conclusion of the routine of FIG. 4, the MBK will be a series of bytes K(0) . . . K(131,071). Prior to executing the routine these bytes are all zeroed. The arbitrary file will have a length W that is either less than $2^{20}$ bits or greater than $2^{20}$ bits (131,072 bytes). In both instances, the random number generator is reseeded with a predetermined parameter P, a counter V is initialized to minus one, and a loop is entered in which V is incremented. The case in which W>131,072 bytes will first be described.

After the counter V has been incremented, a variable B is set to V Mod 131,072. (For the first 131,073 passes through the loop, V Mod 131,072=V.) The Vth byte of the file is then retrieved and placed in a variable A. The key byte K(B) is then XORed, first with A and then with a random number produced by the random number generator. This manner of operation proceeds until each and every record of the file has been used. The resulting virtual key is the series of bytes K(0) . . . K(131,071).

If the file size is less than 131,072 bytes, operation proceeds in a similar manner. However, at least some of the bytes of this file are used twice or more, whereas each of the key bytes is used only once. Say, for example, that the file is $2^{10}$ bits in length (65,536 bytes). Execution of the algorithm may, in this example, be divided into a first half and a second half. During the first half, respective key bytes are XORed with respective bytes from the file. The resulting key byte is further XORed with a random number from the random number generator. At the halfway point the counter counting bytes from the file wraps around. Then during the last half of the algorithm, byte 0 of the file is XORed with key byte K(65,535) the result of which is then XORed with a random number that one of the file is XORed with key byte K(65,536), etc.

Figures 5A, 5B, 5C:
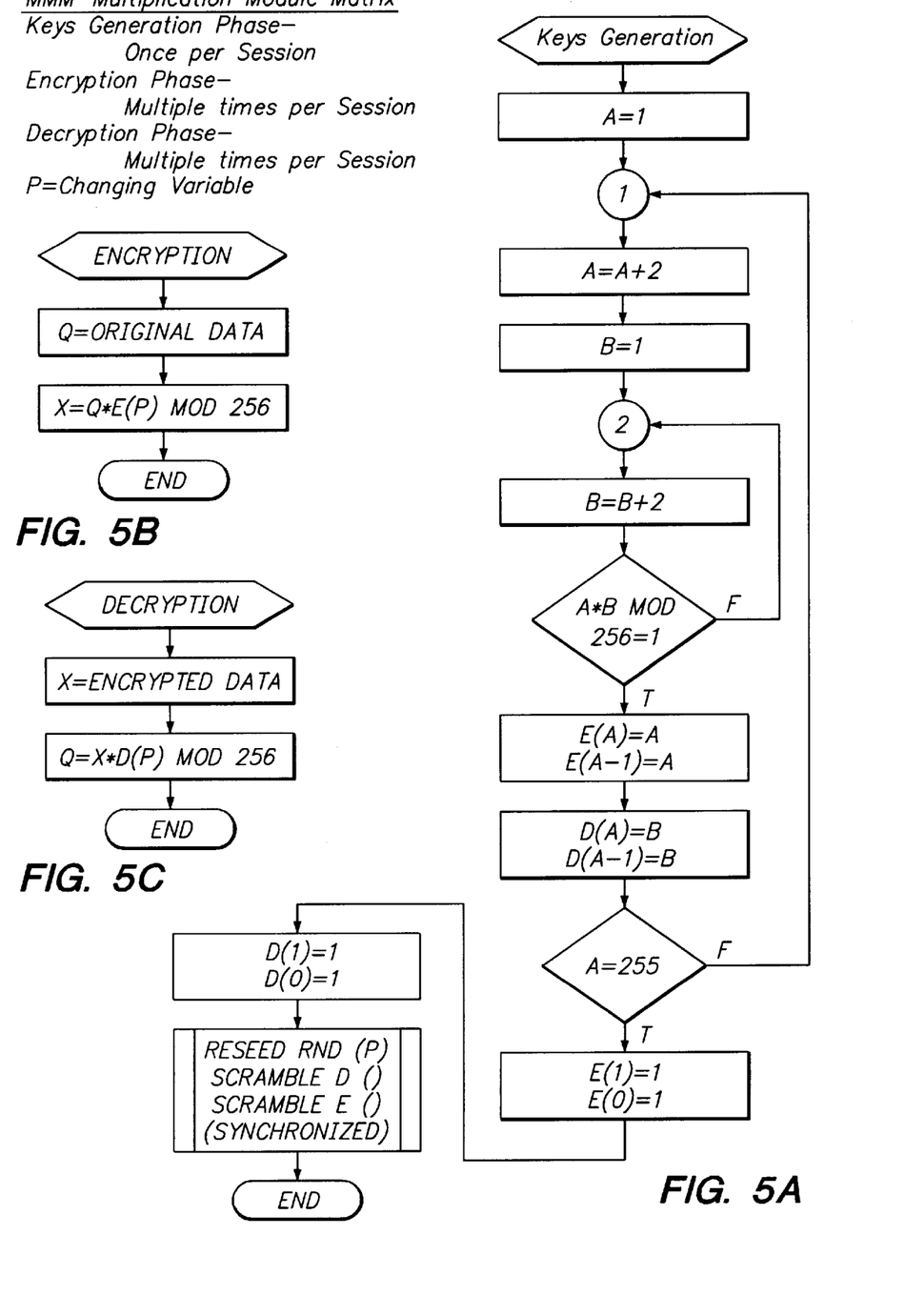
FIG. 5A is a flowchart of key generation for a Multiplication Modulo Matrix (MMM) algorithm.
FIG. 5B is a flowchart of encryption using the MMM algorithm.
FIG. 5C is a flowchart of decryption using the MMM algorithm.

Referring to FIG. 5, the Multiplication Modulo Matrix uses a matrix of number pairs whose product, module 256, equals one. The matrix of number pairs is scrambled in accordance with a random number. As in many other places within data security software, the random number is produced following reseeding of the random number generator with a changing variable P. Generation of the keys, or number pairs, occurs only once per session. Encryption/decryption using the keys, however, may occur many times per session.

Referring first to FIG. 5A, variables A and B, representing a key pair, are first set to one and are thereafter incremented by two. A is incremented within an outer program loop, whereas B is incremented within an inner program loop. For each value of A, B is incremented until A*B Mod 256=1. The values of A and B are then placed in a matrix. Although A and B take only odd values, they are placed at consecutive even and odd locations within the matrix. The outer loop completes when A=255. Subsequent steps handle the "degenerate case" of A=1. Finally, the random number generator is reseeded and the matrix is scrambled in accordance with a resulting random number.

During encryption, FIG. 5B, the original data is multiplied by E(P), the encryption key of a key pair chosen from the matrix in accordance with the changing parameter P. During decryption, FIG. 5C, the encrypted data is multiplied by D(P), the inverse key.

Figure 6:
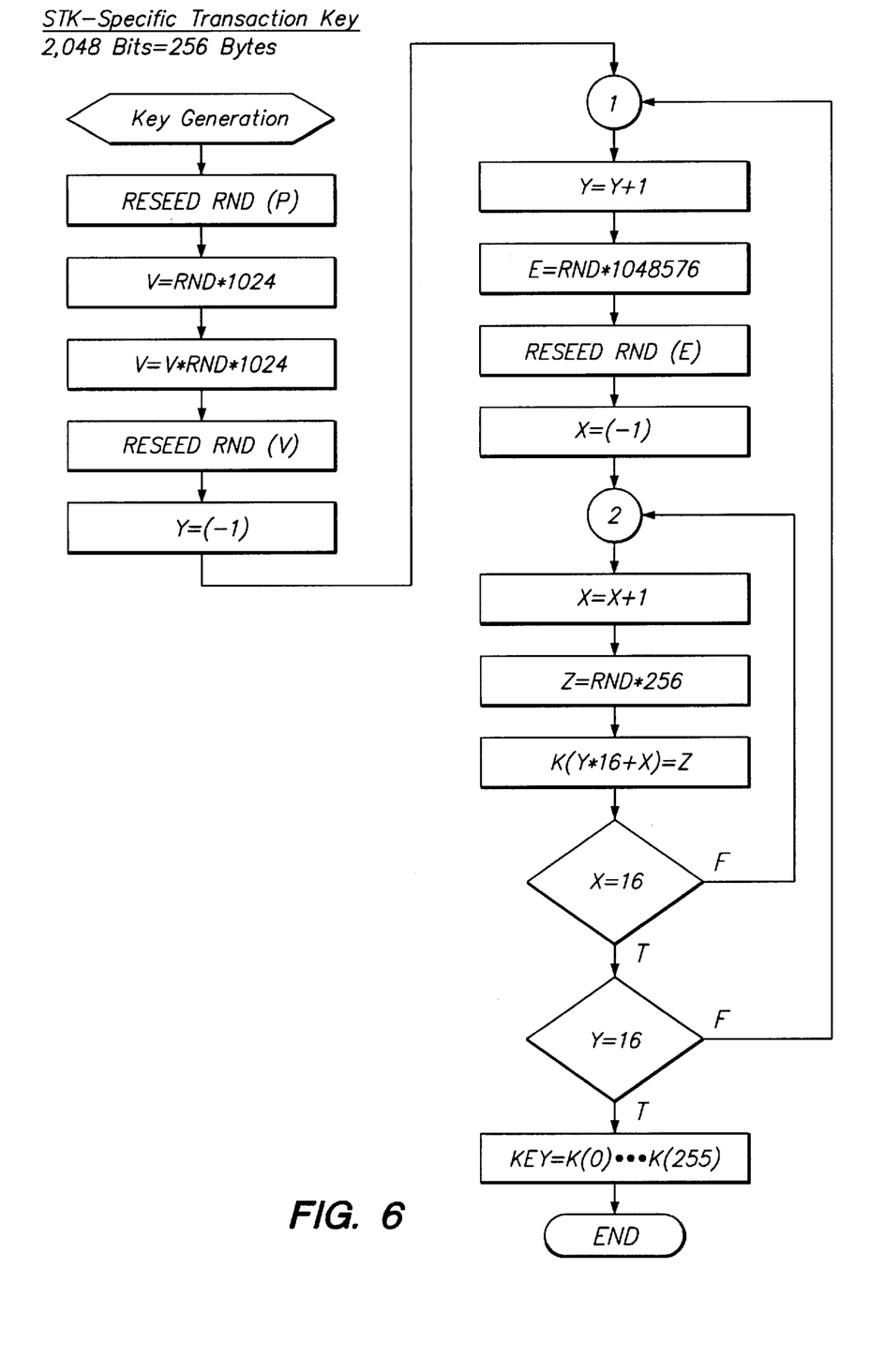
FIG. 6 is a flowchart illustrating generation of a Specific Transaction Key.

Referring to FIG. 6, the manner in which the Specific Transaction Key (STK) is generated will be described in detail. In a preferred embodiment, the STK is 2048 bits (256 bytes) long.

The main work of generating the STK occurs within an outer loop control using a counter Y and an inner loop control using a counter X. Prior to entering the outer loop, however, the random number generator is reseeded. A resulting random number is multiplied by 1024 and the result placed in a variable V. The variable V is then multiplied by a further random number times 1024. The random number generator is then reseeded using V, and the outer loop counter Y is initialized to minus one.

Within the outer loop, Y is incremented, and a random number is generated, multiplied by $22^{20}$ and the result placed in a variable E. The random number generator is then reseeded using E. Within the inner loop, X is incremented, and a random number is generated, multiplied by 256 and the result placed in a variable Z. The key byte K(Y*16+X) is then set to Z. In an exemplary embodiment, the inner loop is executed 16 times for each execution of the outer loop, which is also executed 16 times, for a total of 256 times. A 256-byte key therefore results.

Most known encryption algorithms operate at the byte level. At the byte level, binary numbers are human intelligible. For example, a byte of a given value may represent a particular text character. Byte-level encryption is therefore susceptible to hacking. The present day security software, by contrast, employs as one of its modules a Bit Level Encryption (BLE) module. Using BLE, a byte is encrypted at the bit level. Since a bit is the smallest possible unit of digital information, by itself, a bit is meaningless. Bit Level Encryption is therefore substantially immune to the type of hacking to which byte level encryption is susceptible.

Figure 7:
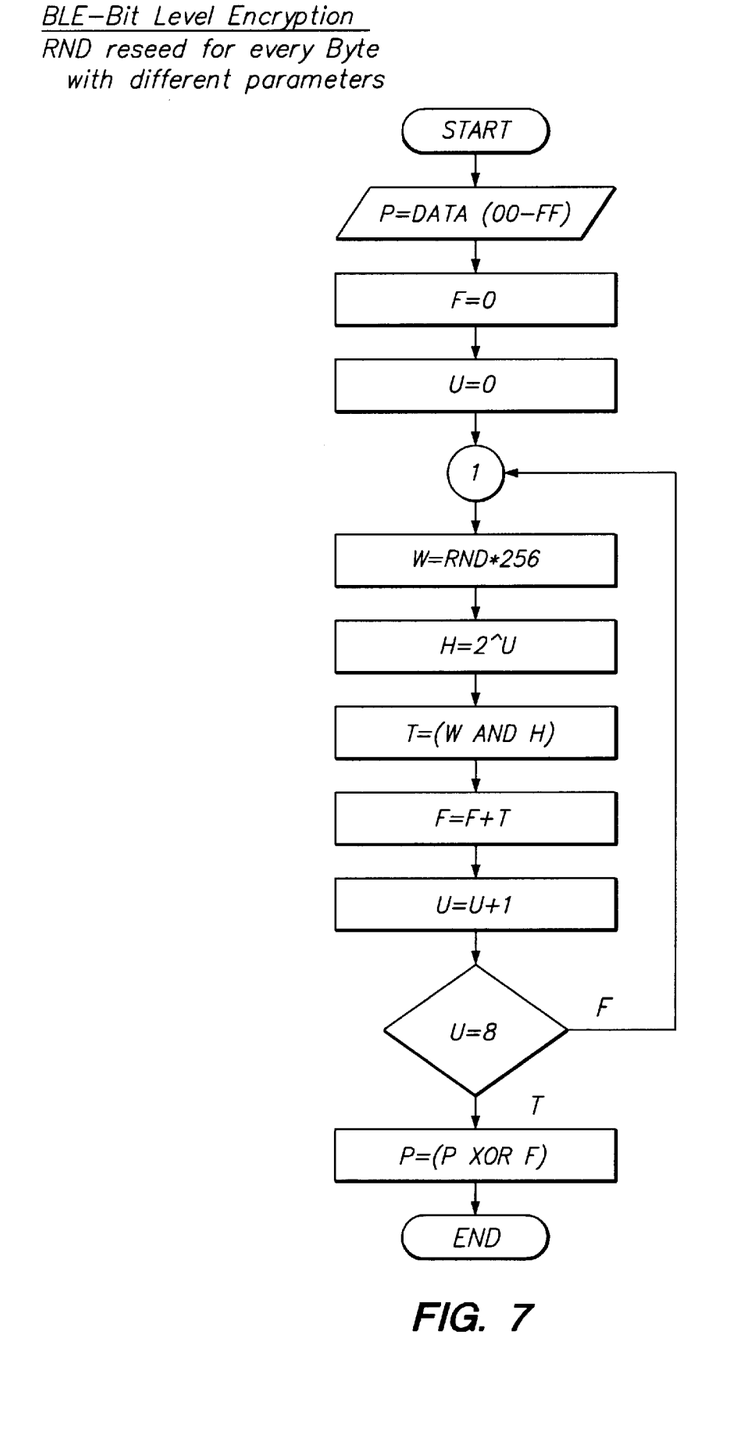
FIG. 7 is a flowchart of a Bit Level Encryption algorithm.

Referring to FIG. 7, during BLE the random number generator is reseeded for every byte with different parameters. BLE is accomplished by XORing a data byte P with a random value F derived from multiple passes (e.g., 8) through a program loop controlled by a variable V. At the outset, F and U are both set to zero, after which the loop is entered.

Within the loop, a random number is generated and multiplied by 256 and the result is placed in a variable W. A variable H is set to $2^U$, and W and H are then ANDed together and the result placed in variable T. ANDing W with H ($2\hat{U}$) will result in only one random bit on or off. The variables F and T are added together. The variable U is then incremented. In an exemplary embodiment, the loop is executed eight times, until U=8. When U=8, the data byte is XORed with F, with the result that the bits of the data byte are randomly toggled.

Figure 8A:
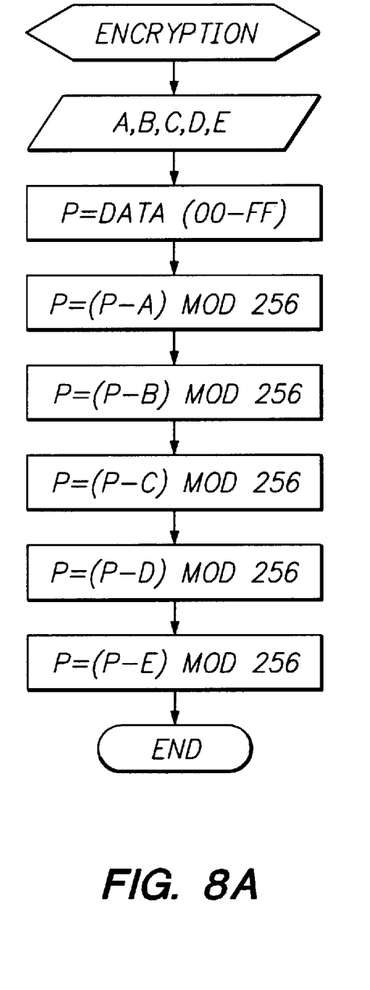
FIG. 8A is a flowchart of encryption in accordance with a Subtraction Modulo Matrix (SMM) algorithm.

The security offered by the present data security software is formidable, not only by virtue of the strength of the individual algorithms but by virtue of combining these algorithms in pipeline fashion as previously described. The Subtraction Module Matrix algorithm, to be presently described, is most effective in combination with other algorithms. The algorithm uses parameters A, B, C, D and E which are changing flow parameters. In an exemplary embodiment these parameters are chosen to ensure that their sum exceeds 256.

Referring to FIG. 8A, P represents a data byte to be encrypted using the parameters A, B, C, D and E. These parameters are each subtracted from the data in turn, modulo 256. In the course of the series of subtractions, an "underflow" is guaranteed to occur. This underflow substantially transforms the data in a complex way in dependence on the parameters A, B, C, D and E.

Figure 8B:
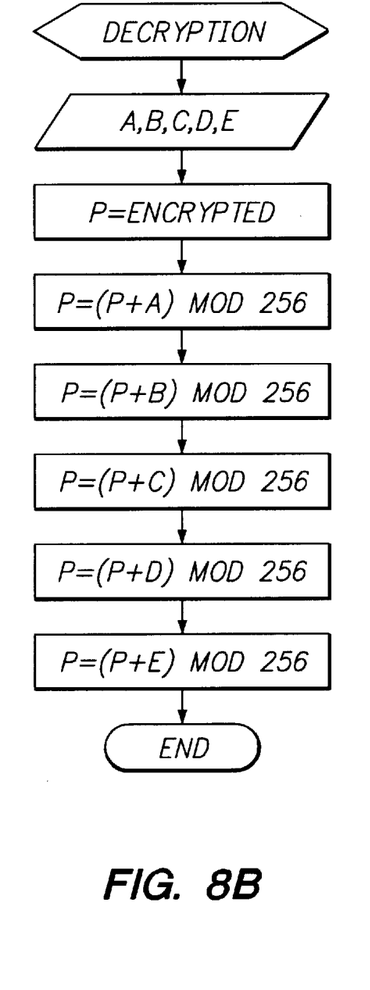
FIG. 8B is a flowchart of decryption using the SMM algorithm.

During decryption, FIG. 8B, the reverse process is followed. That is, A, B, C, D and E are added to the encrypted data in turn, modulo 256. The original data is thereby recovered.

In accordance with prior art security methods, an encrypted message may be decrypted without time limitations. Hence, a message may be intercepted on Day 1, repeated efforts to break the encryption began also on Day 1, and repeated efforts to break the encryption succeed on Day 30, or Day 100. Many existing data security methods rely on computational difficulty to provide data security in the face of brute force attacks. Even if an encrypted message might take a millennium to break, however, the fact remains that a dedicated effort to break the encryption would, over the course of a millennium, succeed.

The present data security software, on the other hand, provides for date limited encryption such that an encrypted message can only be decrypted on a specified date or within a specified range of dates. This functionality is obtained by security embedding date limit information within the STK. During decryption, this date limit information is extracted from the STK and compared with the current date from the computer's real time clock. If the current date is not within the specified range, then the decryption process yields wrong results. Although the date on a computer may be reset, a hacker will not know what the date should be set to. The date limit may be set to allow decryption within a limited time period from the time of encryption, or only on a specific near term date, or even a date or range of dates in the remote future.

Figure 9:
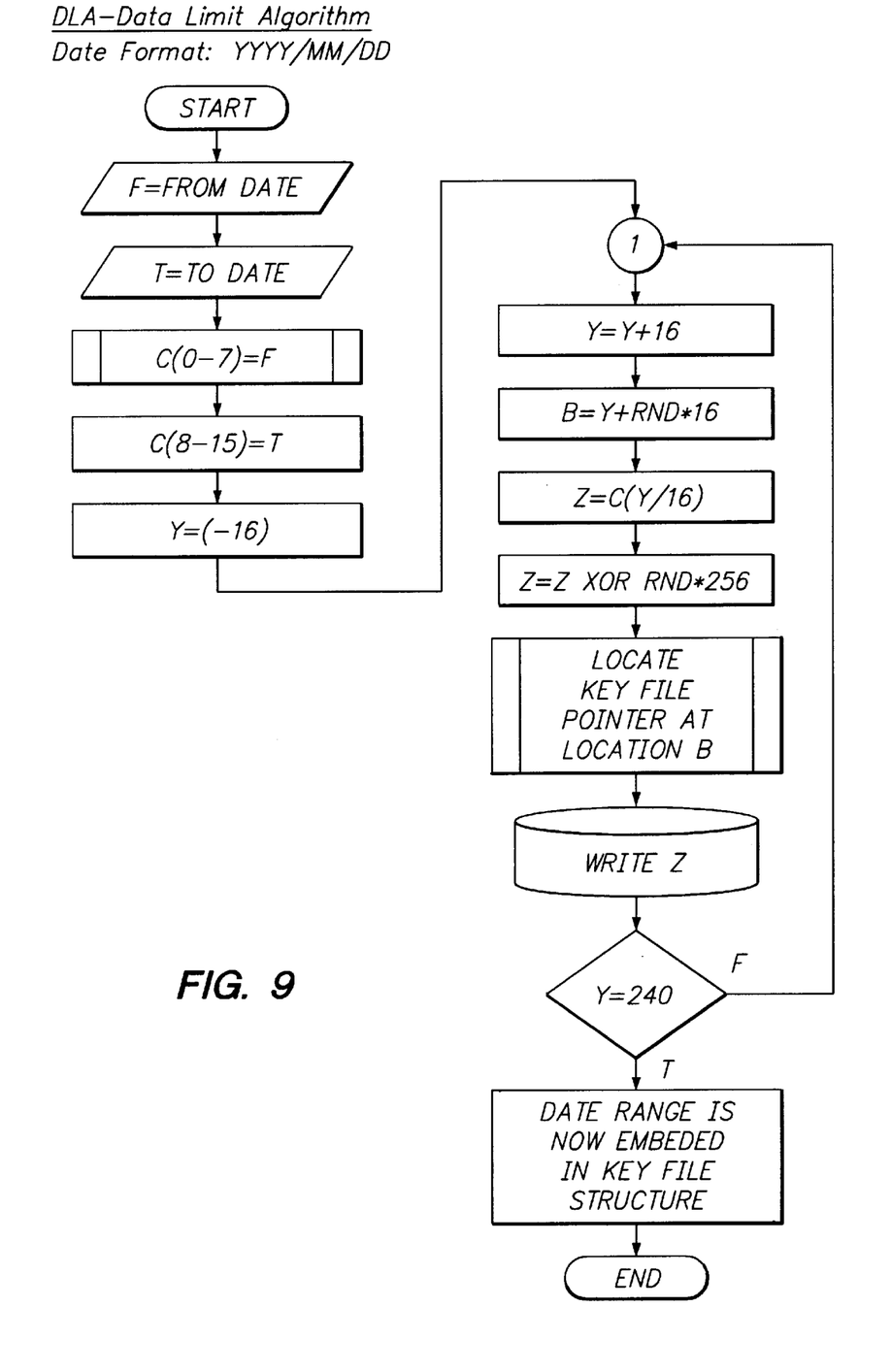
FIG. 9 is a flowchart of a Date Limit algorithm.

Referring to FIG. 9, to set a date limit a FROM date and a TO date are entered. The FROM date is stored as bytes 0–7 of a variable C, and the TO date is stored as bytes 8–15. A counter variable Y used to control loop execution is set to −16.

Within the loop, Y is incremented by 16. A random number is generated, multiplied by 16, and added to Y, and the result is stored in a pointer variable B. Each pass through the loop, the next byte of C, from low to high, is placed in a variable Z. A random number is generated and multiplied by 256, and Z is multiplied by the resulting value, which is stored back in Z. The value of Z is then written to the STK at location B.

When the value of Y reaches 240, all bytes of C will have been written to separate locations within the STK such that the date range is embedded in the key file structure in random locations.

Just as messages may be secured in such a way as to render them time specific, they may also be made recipient specific. The allowed recipients may be anyone having suitable decryption software ("global"), only persons having copies of the software having serial numbers with a specific prefix ("group"), only a person having a copy with a single specified serial number ("specific") or only the sender, using the same software copy used for encryption ("private").

During decryption, the software user must select the appropriate decryption option. Even though the user may be using the right software, if he or she chooses the wrong decryption option, decryption will produce only binary garbage. Likewise the user may also be required to supply one or several other parameters used during encryption (e.g., source identifier, destination identifier, original filename, key generation filename, etc.). If any of the parameters is supplied incorrectly, then decryption will produce only binary garbage.

Figure 10:
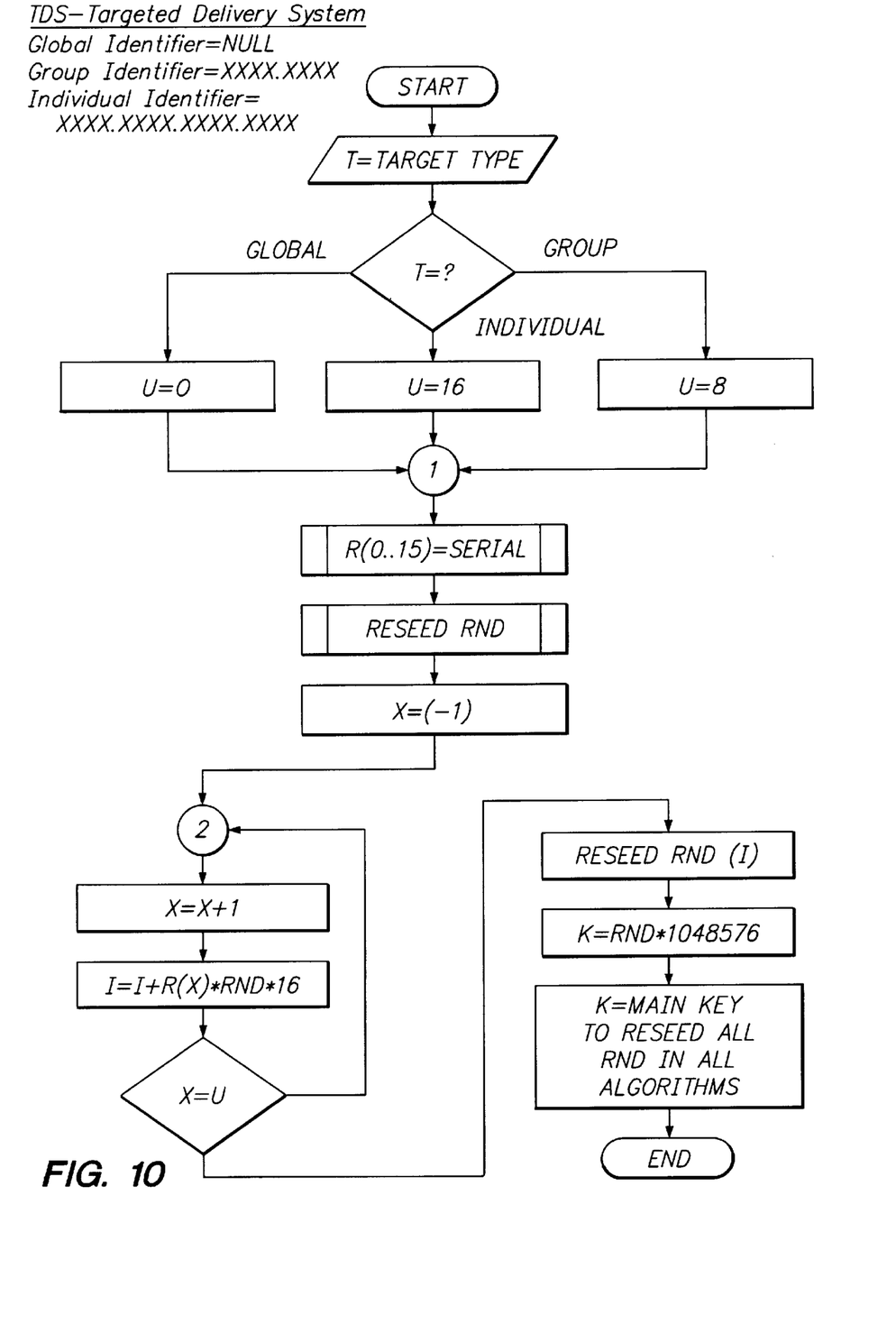
FIG. 10 is a flowchart of a Targeted Delivery System algorithm.

Referring now to FIG. 10, during specification of the encryption parameters, the user specifies the target type as being, in the illustrated example, "global," "group," or "individual." Depending on the selection, a variable U is set to 0, 8 or 16, respectively. The serial number of the software copy being used is input to a variable R. Then, the random number generator is reseeded and a loop counter X is initialized to minus one.

The loop is executed U times. Within the loop, X is incremented. Then a random number is generated, multiplied by 16, multiplied by the Xth value of R (the serial number) and the result added to the identifier I. The identifier I is initially null, and contains U number of bytes of the serial number.

When X=U, the loop concludes. The value of I is used to reseed the random number generator, and a random number is obtained and multiplied by $2^{30}$ to give a key value K. The key value K functions as one of the main keys and is used in conjunction with other keys to reseed the random number generator within all of the algorithms. Hence, without the key K, generated based on the target type and corresponding identifier, there is no hope of successfully decrypting the encrypted message.

The foregoing data security methods may be implemented in software running on a personal computer. In one embodiment, the software is written as a DOS program that may be called from within any of various computing environments. The data security methods may also, if desired by implemented in dedicated hardware, for example within a cellular telephone.

The present data security methods and apparatus having been described, it will be appreciated by those of ordinary skill in the art that the present invention may be embodied in other specific forms without departing from the spirit or essential character thereof. The presently disclosed embodiments are therefore intended in all respects to be illustrative and not restrictive. The scope of the invention is indicated by the appended claims rather than the foregoing description, and all changes which come within the meaning and the range of equivalents thereof are intended to be embraced therein.

What is claimed is:

1. A method of encrypting a data message comprising a series of unencrypted data values, the method comprising the steps of:

generating a matrix of possible unencrypted data values; and for a given unencrypted data value:

locating the unencrypted data value in the matrix and substituting for the given unencrypted data value a pointer to the unencrypted data value within the matrix; and prior to having completed encryption of the data message, changing a location of a given unencrypted data value within the matrix in a pseudo random fashion; wherein the change in location of the given unencrypted data value within the matrix does not reveal a new location of other different unencrypted data values.

2. The method of claim 1 comprising the further steps of:

successively subtracting from one of an unencrypted data value and a previously encrypted data value each of a plurality of predetermined parameters;

wherein the predetermined parameters are selected so as to ensure that a machine limit on number representation is encountered.

3. A method of encrypting a data message comprising a series of unencrypted data values, the method comprising the steps of:

encrypting an unencrypted data value multiple times using a plurality of encryption algorithms arranged in pipeline fashion, at least one of said encryption algorithms using a random number obtained from a random number generator seeded with a predetermined parameter of the encryption process;

wherein one of a plurality of encryption algorithms comprises generating a matrix of possible unencrypted data values and, for a given unencrypted data value:

locating the unencrypted data value in the matrix and substituting for the given unencrypted data value a pointer to the unencrypted data value within the matrix; and changing a location of a given unencrypted data value within the matrix.

4. A method of securely exchanging a data message between a first user and a second user using a common cryptographic key without exchanging the key, the method comprising the steps of:

specifying a computer file of arbitrary size commonly available to both the first user and the second user;

the first user using the computer file of arbitrary size to generate the common key and encrypt the data message, the common key being of a predetermined large size;

transmitting the encrypted message to the second user through an in-band channel; and the second user using the computer file to generate the common key and decrypt the data message, wherein the common key generating steps do not require the computer file to be of a predetermined size.

5. The method of claim 4, comprising the further steps of:

generating a session specific key;

transmitting the session specific key through the in-band channel; and using the session specific key to scramble the common key prior to using the common key.

6. Using a copy of a program having an assigned serial number, a method of encrypting a data message so as to allow decryption of the data message only by a specified target audience, the method comprising the steps:

specifying a target audience and selecting a variable length portion of the serial number;

performing a sequence of operations on the variable length portion to form a key; and using the key during encryption of the data message.

7. The method of claim 6 wherein the variable length portion is of 0 length, and the specified target audience includes all users of said program, regardless of serial number.

8. The method of claim 6 wherein the variable length portion is of maximum length, and the specified target audience includes only the user of a copy of said program bearing a specific serial number.

9. The method of claim 6 wherein the variable length portion is of an intermediate length, and the specified target audience includes users of copies of said program bearing serial numbers having a common portion and a distinct portion.

10. A method of encrypting a data message comprising a series of unencrypted data values, comprising the steps of:

generating a random number;

deriving a random value using said random number; and logically combining said random value with a data value to be encrypted, wherein different bits of the data value to be encrypted are randomly toggled from one logical state to another logical state.

11. A method of encrypting a data message comprising a series of unencrypted data values, the method comprising the steps of:

providing a multiplicity N of encryption algorithms;

generating a random number;

deriving a random value using said random number; and performing an N-way branch and encrypting the data value to be encrypted using a random one of said N encryption algorithms.

12. A method of encrypting a data message comprising a series of unencrypted data values, the method comprising the steps of:

building a matrix of paired values, values of a pair being multiplicative inverses of one another in accordance with modulo arithmetic;

scrambling the matrix;

generating a random number;

deriving a random value using said random number;

selecting a pair of values based on said random number; and encrypting a data value to be encrypted by multiplying it by one value of said pair of values.

13. A method of encrypting a data message comprising a series of data values to produce an encrypted data message, the method comprising the steps of:

a user specifying a date limit restricting the dates on which the data message may be decrypted;

deriving from the data limit a derived key; and encrypting the data message using at least the derived key.

14. A method of decrypting an encrypted data message having combined therewith an encrypted date limit restricting the dates on which the encrypted data message may be decrypted, the method comprising the steps of:

deriving from the current date a derived key; and attempting to decrypt the encrypted data message using at least the derived key;

wherein, if the current date does not correspond to a date limit imposed during encryption, decryption fails.

15. The method of claim 4, wherein a copy of the computer file is local to the first and second user.

16. The method of claim 15, wherein the computer file has a primary purpose other than in the cryptographic algorithm.

* * * * *